United States Patent
Okada et al.

(10) Patent No.: US 7,438,480 B2
(45) Date of Patent: Oct. 21, 2008

(54) OPTICAL MODULE, OPTICAL TRANSCEIVER, AND OPTICAL JOINT SLEEVE

(75) Inventors: Takeshi Okada, Osaka (JP); Hiromi Nakanishi, Yokohama (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/573,319

(22) PCT Filed: Sep. 24, 2004

(86) PCT No.: PCT/JP2004/013936

§ 371 (c)(1),
(2), (4) Date: Nov. 16, 2006

(87) PCT Pub. No.: WO2005/031410

PCT Pub. Date: Apr. 7, 2005

(65) Prior Publication Data

US 2007/0071444 A1    Mar. 29, 2007

(30) Foreign Application Priority Data

Sep. 25, 2003    (JP)    ............................. 2003-333680

(51) Int. Cl.
*G02B 6/36* (2006.01)
(52) U.S. Cl. .............................. 385/88; 385/89; 385/93; 385/49; 385/15; 385/24; 385/33; 385/34; 385/35; 359/634; 359/629; 359/628; 359/637; 398/135; 398/139
(58) Field of Classification Search ................. 359/634, 359/129, 637; 257/414; 372/36; 385/14, 385/31, 35, 37, 88–90, 49, 92–93; 398/135, 398/139
See application file for complete search history.

(56) References Cited

U.S. PATENT DOCUMENTS

| | | | | | |
|---|---|---|---|---|---|
| 5,408,559 | A | * | 4/1995 | Takahashi et al. ............. | 385/89 |
| 5,841,562 | A | * | 11/1998 | Rangwala et al. ........... | 398/139 |
| 6,252,719 | B1 | * | 6/2001 | Eichenbaum ............... | 359/634 |
| 6,597,713 | B2 | * | 7/2003 | Ouchi ......................... | 372/36 |
| 6,900,509 | B2 | * | 5/2005 | Gallup et al. ............... | 257/414 |
| 6,939,058 | B2 | * | 9/2005 | Gurevich et al. ............. | 385/93 |
| 6,954,592 | B2 | * | 10/2005 | Tan et al. .................... | 398/138 |

(Continued)

FOREIGN PATENT DOCUMENTS

JP    06-160674    6/1994

(Continued)

*Primary Examiner*—Brian Healy
*Assistant Examiner*—Guy G Anderson
(74) *Attorney, Agent, or Firm*—Fish & Richardson P.C.

(57) ABSTRACT

An optical module 1 comprises a first optical element F1, a first light receiving subassembly PD1, a second optical element F2, a second light receiving subassembly PD2, a light emitting subassembly LD3 for generating light, and a light transmitting part 3 optically coupled to the first optical element. The light emitting subassembly LD3, the first optical element F1, the second optical element F2 and the first light receiving subassembly PD1 are arranged along a predetermined plane S1. The light emitting subassembly LD3, the first optical element F1, the second optical element F2, and the second light receiving subassembly PD2 are arranged along another predetermined plane S2. The predetermined plane S1 intersects at a predetermined angle with the other predetermined plane S2.

21 Claims, 10 Drawing Sheets

U.S. PATENT DOCUMENTS 7,088,518 B2 * 8/2006 Tatum et al. ................ 359/634

FOREIGN PATENT DOCUMENTS

| JP | 10-093133 | 4/1998 |
| JP | 2003-075687 | 3/2003 |
| JP | 2003-524789 | 8/2003 |
| JP | 30972224 | 1/2004 |
| WO | WO 99/57594 | 11/1999 |

* cited by examiner

Fig.8
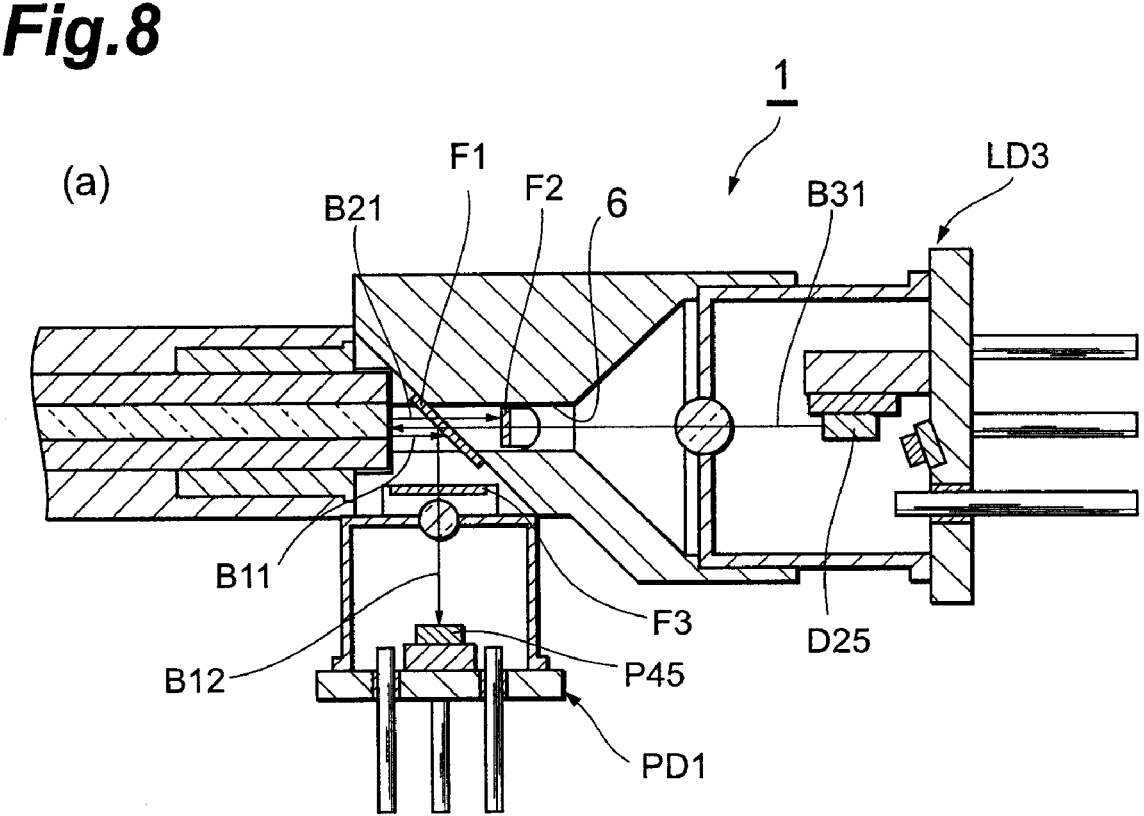
(a)
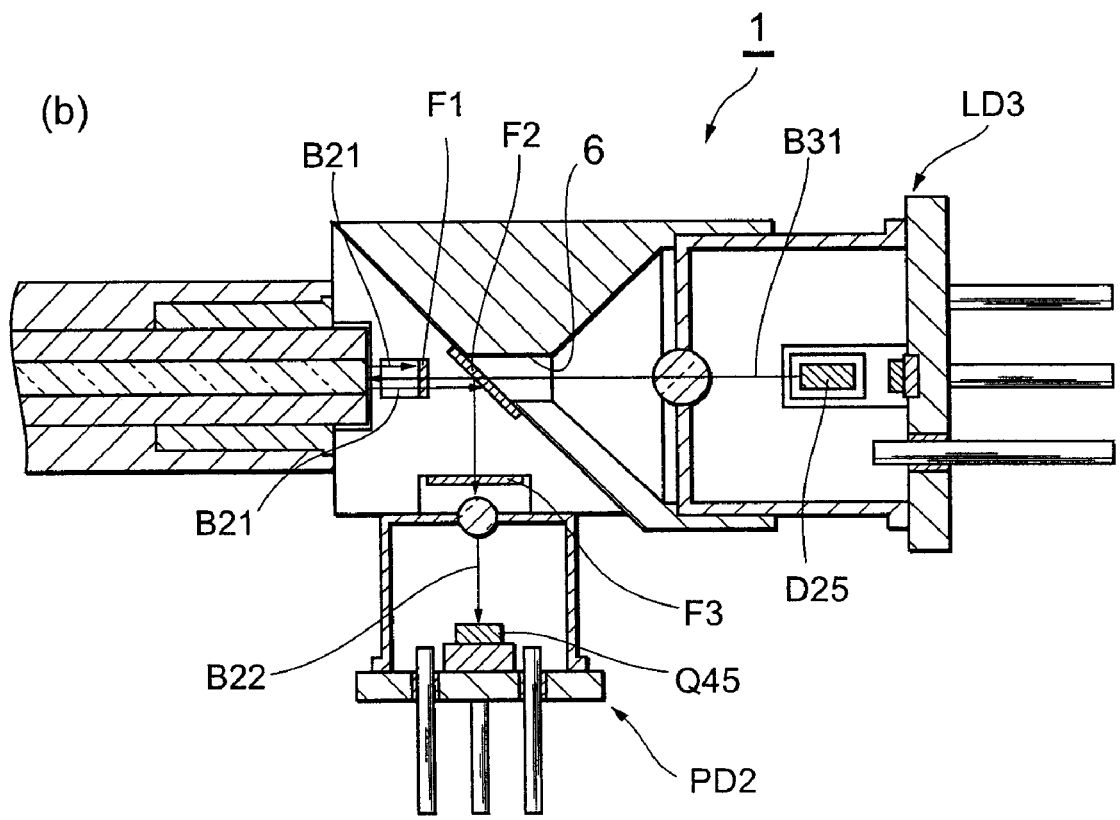
(b)

OPTICAL MODULE, OPTICAL TRANSCEIVER, AND OPTICAL JOINT SLEEVE

TECHNICAL FIELD

The present invention relates to an optical module, an optical transceiver, and an optical joint sleeve.

BACKGROUND ART

FIG. 10 shows an optical module 201 including a transmitting portion 202 and a receiving portion 203 (e.g., reference is made to Patent Document 1). In this optical module 201, the transmitting portion 202 generates a digital optical signal, and this optical signal is outputted to an optical fiber 205. The optical module 201 receives a digital optical signal. This optical signal is reflected by an optical element 204 and the reflected light signal is incident to the light receiving portion 203. This optical module 201 is able to transmit and receive digital optical signals. Patent Document 1: Japanese Patent Application Laid-Open No. 10-93133

DISCLOSURE OF THE INVENTION

Problem to be Solved by the Invention

In recent years, there are needs for an optical transceiver capable of transmitting and receiving digital optical signals, and further receiving another optical signal, such as, a video signal for CATVs. But, the optical module 201 is unable to receive an additional optical signal other than the light signal that the receiving portion 203 receives because the optical module 201 includes only one transmitting portion and one receiving portion. Optical modules are required to receive multiple optical signals.

It is, therefore, an object of the present invention to provide an optical module and an optical transceiver capable of receiving a plurality of optical signals in addition to transmission of another optical signal, and to provide an optical joint sleeve for these optical module and optical transceiver.

MEANS FOR SOLVING THE PROBLEM

An optical module according to the present invention comprises: a first optical element for reflecting an optical signal of a first wavelength component and transmitting an optical signal of second and third wavelength components; a first light receiving subassembly, optically coupled to the first optical element, provided to receive the optical signal of the first wavelength component; a second optical element for reflecting the optical signal of the second wavelength component and transmitting the optical signal of the third wavelength component; a second light receiving subassembly, optically coupled to the second optical element, provided to receive the optical signal of the second wavelength component; a light emitting subassembly, optically coupled to the second optical element, provided to generate the optical signal of the third wavelength component; and a light transmitting part optically coupled to the first optical element. The light emitting subassembly, the first optical element, the second optical element, and the first light receiving subassembly are arranged along a predetermined plane, and the light emitting subassembly, the first optical element, the second optical element, and the second light receiving subassembly are arranged along another predetermined plane intersecting at a predetermined angle with said predetermined plane.

In this optical module, the light emitting subassembly generates an optical signal and the generated optical signal is outputted to the light transmitting part. An optical signal from the light transmitting part is fed to the first light receiving subassembly and to the second light receiving subassembly. The optical module enables reception of multiple optical signals in addition to transmission of an optical signal.

In the optical module according to the present invention, the second wavelength may be between the first wavelength and the third wavelength.

First, when certain wavelengths $\lambda s$, $\lambda t$ and the first, second, and third wavelength components are in the following relationship: the first wavelength component>$\lambda s$>the second wavelength component>$\lambda t$>the third wavelength component, the first optical element may be arranged to have such an optical characteristic as to reflect light of a wavelength component longer than the wavelength $\lambda s$ and to transmit light of a wavelength component shorter than the wavelength $\lambda s$, and the second optical element may be arranged to have such an optical characteristic as to reflect light in a wavelength component longer than the wavelength $\lambda t$ and to transmit light of a wavelength component shorter than the wavelength $\lambda s$.

Next, when the certain wavelengths $\lambda s$, $\lambda t$ and the first, second, and third wavelength components are in the following relationship: first wavelength component<$\lambda s$<second wavelength component<$\lambda t$<third wavelength component, the first optical element may be arranged to have such an optical characteristic as to reflect light of a wavelength component shorter than the wavelength $\lambda s$ and to transmit light of a wavelength components longer than the wavelength $\lambda s$, and the second optical element may be arranged to have such an optical characteristic as to reflect light in a shorter wavelength region than the wavelength $\lambda t$ and to transmit light in a longer wavelength region than the wavelength $\lambda s$. According to the above optical module, the optical characteristics of the first and second optical elements may have spectra in which the reflectance and transmittance significantly vary at the associated boundary wavelength values $\lambda s$, $\lambda t$. Therefore, it becomes easier to produce the first and second optical elements.

The optical module according to the present invention may further comprise a third optical element provided between the first optical element and the first light receiving subassembly and having an optical characteristic to transmit the optical signal of the first wavelength component and to intercept the optical signal of the second and third wavelength components.

In the above optical module, if the optical signal of the second and third wavelength components is incident to the first light receiving subassembly, noise will be generated in the first subassembly. The third optical element can reduce the noise in the first light receiving subassembly.

The optical module according to the present invention further comprises a fourth optical element provided between the second optical element and the second light receiving subassembly and having an optical characteristic to transmit the optical signal of the second wavelength component and to intercept the optical signal of the first and third wavelength components.

In the above optical module, if the optical signal of the first and third wavelength components is incident to the second light receiving subassembly, noise will be generated in the second subassembly. The fourth optical element can reduce the noise in the second light receiving subassembly.

In the optical module according to the present invention, the light transmitting component has an optical fiber, the light emitting subassembly has a semiconductor laser, and each of the first and second light receiving subassemblies has a photodiode.

In the optical module according to the present invention, the first wavelength component is 1.54 μm or more and 1.65 μm or less; the second wavelength component is 1.47 μm or more and 1.50 μm or less; the third wavelength component is 1.26 μm or more and 1.38 μm or less.

An optical joint sleeve according to the present invention comprises: one end portion, another end portion, and a side wall portion which are arranged along a predetermined axis. The side wall portion has a side face extending in a direction of the predetermined axis and the side face is provided to permit light to pass through from one of the one end portion and the other end portion to the other. The optical joint sleeve further comprises a first mount surface extending along a first axis intersecting with the predetermined axis and provided for mounting a first optical element thereon; and a second mount surface extending along a second axis intersecting with the predetermined axis and provided for mounting a second optical element thereon. A first plane defined by the first axis and the predetermined axis intersects with a second plane defined by the second axis and the predetermined axis.

In the optical joint sleeve, the first and second optical elements are positioned on the optical joint sleeve by use of the first and second mount surfaces, respectively. By using the optical joint sleeve, therefore, it becomes easier to assemble the optical module.

In the optical joint sleeve according to the present invention, the side wall portion includes a first support positioned relative to the first mount surface and the first support is provided for supporting the first light receiving subassembly, and the side wall portion includes a second support positioned relative to the second mount surface and the second support is provided for supporting the second light receiving subassembly.

With this optical joint sleeve, the first and second light receiving subassemblies are positioned on the optical joint sleeve by use of the first and second support, respectively. By using the optical joint sleeve, therefore, it becomes easier to assemble the optical module.

The optical module of the present invention may further comprise an optical joint sleeve. The light transmitting part is provided at the one end portion of the optical joint sleeve, the light emitting subassembly is provided at the other end portion, the first optical element is mounted on the first mount surface, the second optical element is mounted on the second mount surface, and the optical joint sleeve holds the first light receiving subassembly and the second light receiving subassembly.

In the optical module according to the present invention, the side wall portion of the joint sleeve includes a first support positioned relative to the first mount surface and provided for supporting the first light receiving subassembly. The side wall portion of the joint sleeve further includes a second support positioned relative to the second mount surface and provided for supporting the second light receiving subassembly. The first light receiving subassembly is provided on the first support of the side wall portion. The first light receiving subassembly is positioned relative to the first optical element. The second light receiving subassembly is positioned relative to the second optical element. The light emitting subassembly is provided at the end portion of the joint sleeve, and the light emitting subassembly is positioned relative to the second optical element.

In the optical module, the optical joint sleeve permits the positioning of the first and second light receiving subassemblies on the first and second mount surfaces, respectively.

The optical module according to the present invention, the light transmitting part is provided at the other end portion of the joint sleeve and the light transmitting part is positioned relative to the first optical element.

The optical joint sleeve permits the positioning of the light transmitting part to the first optical element.

In the optical module according to the present invention, the first optical element, the second optical element, and the light emitting subassembly are arranged along the predetermined axis by means of the joint sleeve. According to this optical module, the optical joint sleeve enables the aforementioned arrangement of the first optical element, the second optical element, and the light emitting subassembly.

An optical transceiver according to the present invention comprises: the optical module in any one of the above-described configurations; a first substrate electrically connected to the first light receiving subassembly; and a second substrate electrically connected to the light emitting subassembly and to the second light receiving subassembly, and extending along the other predetermined plane.

In the above optical transceiver, a circuit element for processing an electric signal associated with the first light receiving subassembly can be provided on the first substrate. A circuit element for processing electric signals associated with the light emitting subassembly and the second light receiving subassembly can be provided on the second substrate.

In the optical transceiver according to the present invention, the first light receiving subassembly receives a video signal light and the second light receiving subassembly receives a digital modulated signal light.

In the optical transceiver according to the present invention, the first light receiving subassembly receives an analog modulated signal light, and the second light receiving subassembly receives a digital modulated signal light.

The optical transceiver according to the present invention, the first substrate mounts the second substrate thereon, and the second substrate and the optical module are provided along the other predetermined plane.

The optical transceiver according to the present invention further comprises: a first electronic device mounted on the first substrate and provided to process a video signal from the first light receiving subassembly; and a second electronic device mounted on the second substrate and provided to process a digital modulated signal from the second light receiving subassembly.

The optical transceiver according to the present invention further comprises: a processing circuit mounted on the first substrate and provided to process an analog modulated signal from the first light receiving subassembly; and a processing circuit mounted on the second substrate and provided to process a digital modulated signal from the second light receiving subassembly.

Effect of the Invention

The present invention provides the optical module enabling the reception of multiple optical signals in addition to the transmission of the optical signal, and also provides the optical transceiver, and the optical joint sleeve for these optical module and optical transceiver.

BRIEF DESCRIPTION OF THE DRAWINGS

FIG. 8 includes area (a) showing a sectional view of the optical module taken along line I-I, and area (b) showing a sectional view of the optical module taken along line II-II.

DESCRIPTION OF REFERENCE SYMBOLS

1 . . . optical module; 3 . . . light transmitting part; 5 . . . optical joint sleeve; 5s . . . first mount surface; 5t . . . second mount surface; 5u . . . third mount surface; 5v . . . fourth mount surface; 6c . . . side wall portion; 101 . . . optical transceiver; 103 . . . first substrate; 105 . . . second substrate; A, A1, and A2 . . . axes; C1 and C2 . . . grooves; F1 . . . first optical element; F2 . . . second optical element; F3 . . . third optical element; F4 . . . fourth optical element; D25 . . . light emitting element; LD3 . . . light emitting subassembly; P45 and Q45 . . . light receiving elements; P53 and Q53 . . . lenses; PD1 . . . first light receiving subassembly; PD2 . . . second light receiving subassembly; S1 . . . plane; S2 . . . plane.

BEST MODE FOR CARRYING OUT THE INVENTION

Embodiments of the present invention will be described below. When possible, parts identical to each other will be referred to with reference symbols identical to each other.

Figure 1:
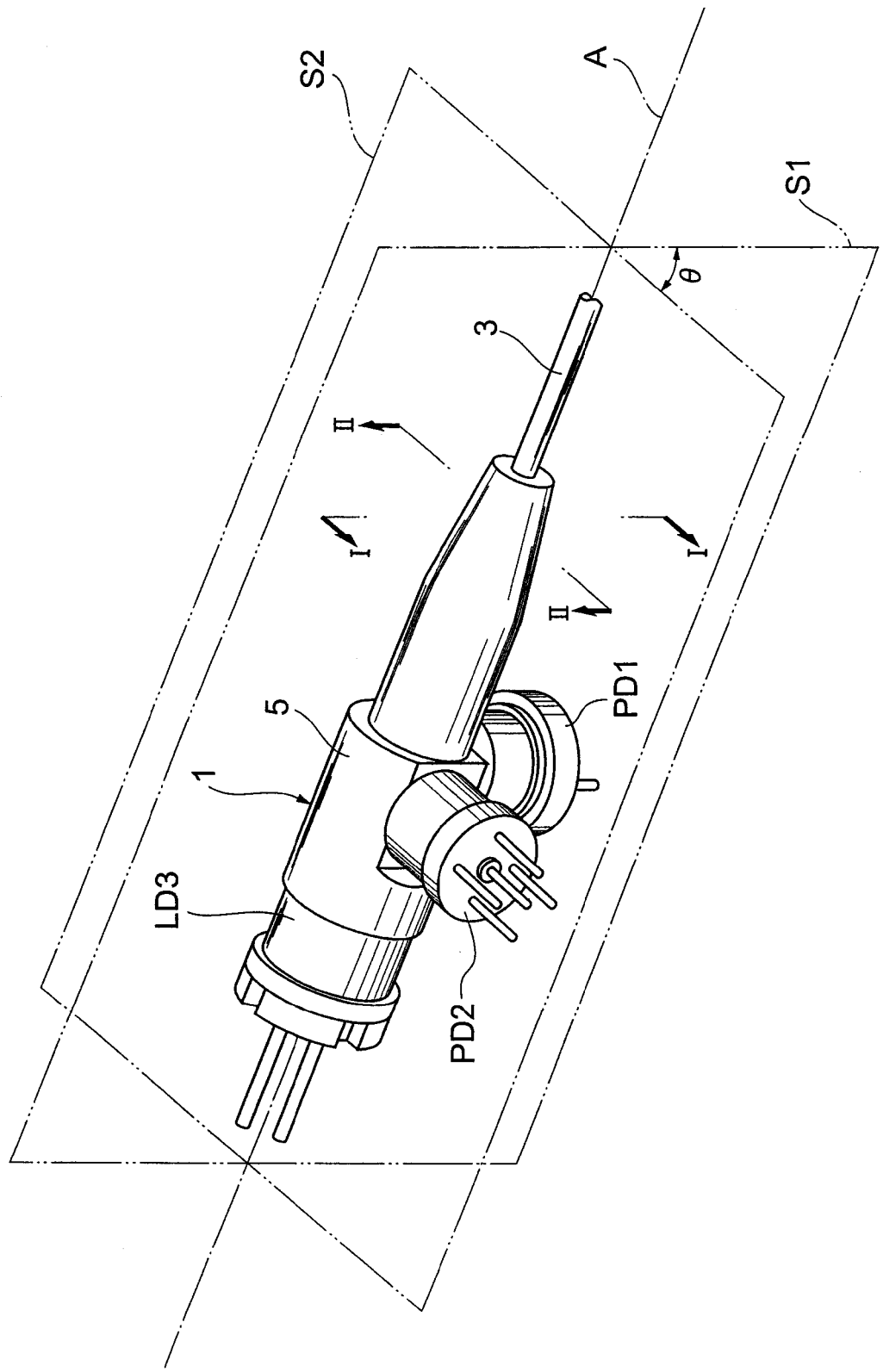
FIG. 1 shows a perspective view of an optical module.
Figure 2:
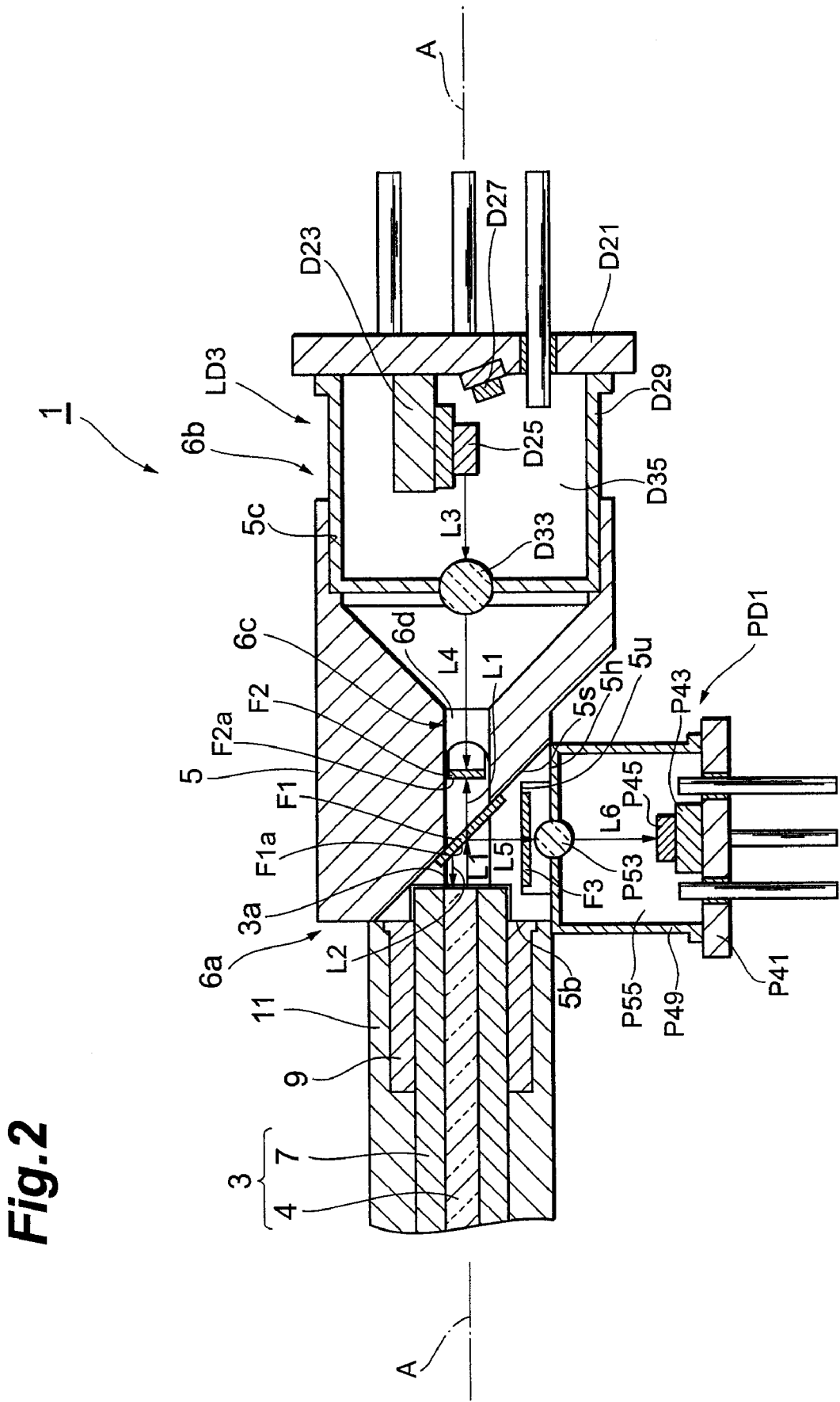
FIG. 2 is a sectional view showing the optical module taken along line I-I.
Figure 3:
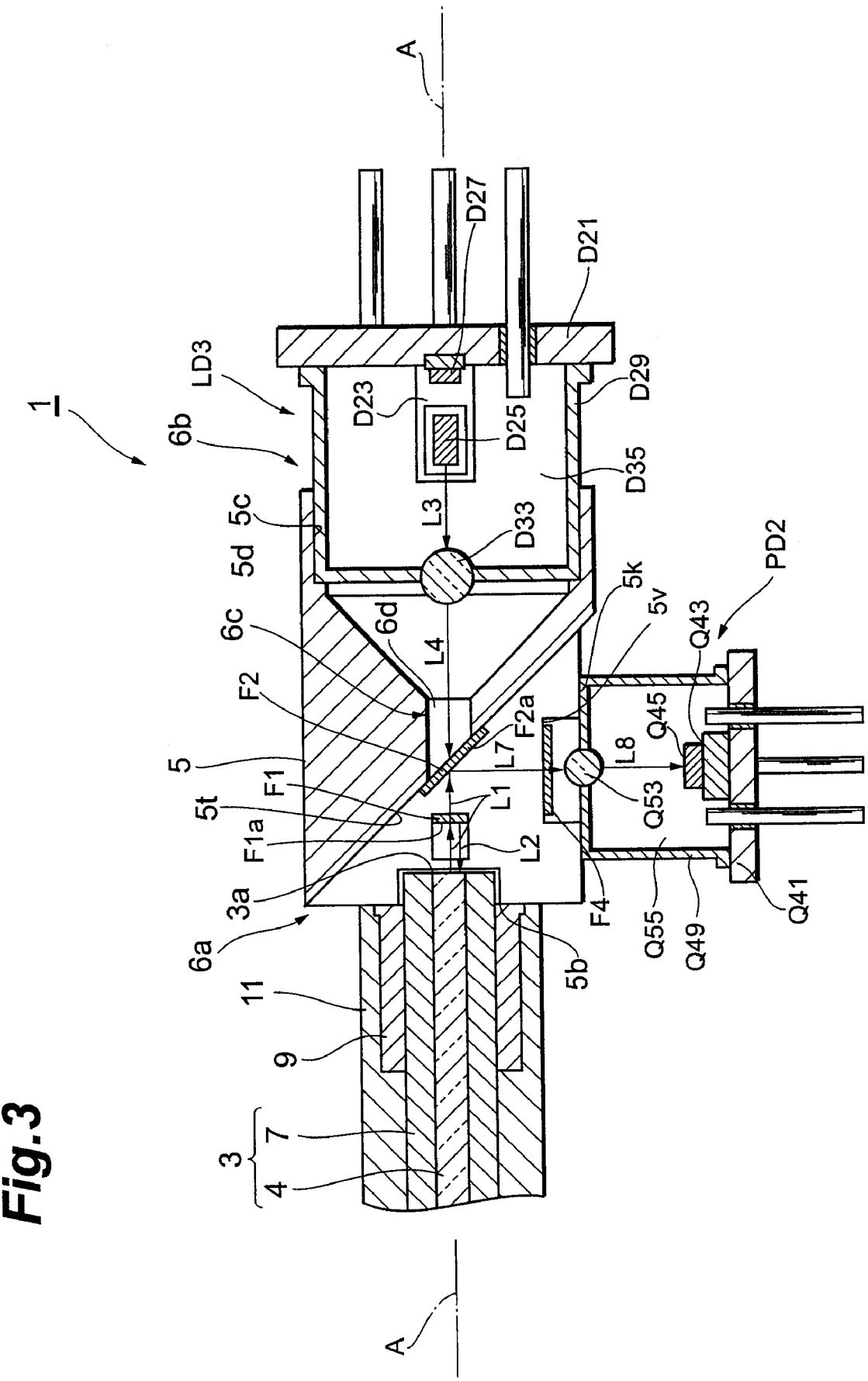
FIG. 3 is a sectional view showing the optical module taken along line II-II.

An optical module 1 according to an embodiment of the present invention will be described with reference to FIGS. 1, 2, and 3. FIG. 1 is a perspective view showing the optical module 1. FIG. 2 is a sectional view of the optical module 1 taken along line I-I in FIG. 1. FIG. 3 is a sectional view of the optical module 1 taken along line II-II in FIG. 1.

The optical module 1 comprises a light emitting subassembly LD3, a first optical element F1, a second optical element F2, a third optical element F3, a fourth optical element F4, and a first light receiving subassembly PD1. As shown in FIGS. 1 and 2, a light transmitting part 3, the light emitting subassembly LD3, the first optical element F1, the second optical element F2, the third optical element F3, and the first light receiving subassembly PD1 are arranged along a reference plane S1. The optical module 1 further comprises a second light receiving subassembly PD2. As shown in FIGS. 1 and 3, the light transmitting part 3, a light emitting subassembly LD3, a first optical element F1, a second optical element F2, a fourth optical element F4, and a second light receiving subassembly PD2 are arranged along a reference plane S2. These planes S1 and S2 intersect with each other at a predetermined angle on an axis A. Each of the planes S1 and S2 is divided into two parts by the axis A. With reference to FIG. 1, symbol "θ" indicates the angle between the plane S1 (intersecting with the first light receiving subassembly PD1) and the plane S2 (intersecting with the second light receiving subassembly PD2). The angle "θ" can be in the range of 0 degree or more and 180 degrees or less, for example, and the angle "θ" is set, for example, at 90 degrees.

The light transmitting part 3, first optical element F1, second optical element F2, and light emitting subassembly LD3 are arranged sequentially along the axis A. The axis A corresponds to a straight line on which the plane S1 and plane S2 intersect with each other. The light transmitting part 3 is optically coupled to the first optical element F1. The first optical element F1 is optically coupled to the second optical element F2. The second optical element F2 is optically coupled to the light emitting subassembly LD3. The first optical element F1 is optically coupled to the first light receiving subassembly PD1, and the second optical element F2 is optically coupled to the second light receiving subassembly PD2.

The third optical element F3 is provided between the first optical element F1 and the first light receiving subassembly PD1. The first optical element F1 is optically coupled to the third optical element F3, and the third optical element F3 is optically coupled to the first light receiving subassembly PD1. The fourth optical element F4 is provided between the second optical element F2 and the second light receiving subassembly PD2. The second optical element F2 is optically coupled to the fourth optical element F4, and the fourth optical element F4 is optically coupled to the second light receiving subassembly PD2.

An incident optical signal L1 containing wavelength components $\lambda_1$ and $\lambda_2$ is sent toward the first optical element F1 from an end face 3a of the light transmitting part 3. The light transmitting part 3 receives light L2 from the first optical element F1 at the end face 3a and transmits the received light L2. The light transmitting part 3 is a device including an optical fiber 4 and a ferrule 7, for example. The ferrule 7 holds the optical fiber 4. A sleeve 9 is disposed outside the ferrule 7 and holds the ferrule 7.

As shown in FIGS. 2 and 3, the light emitting subassembly LD3 has a stem D21, a pole D23, a light emitting element D25, a monitor light receiving element D27, a CAN cap D29, and a lens D33. The pole D23 is provided on the stem D21. The CAN cap D29 holds the lens D33. The light emitting element D25 is mounted on a side face of the pole D23. A semiconductor laser, for example, can be used for the light emitting element D25. Light L3 from the front end face of the light emitting element D25 is incident to the lens D33. The light L3 passes through the lens D33 and is converted by the lens D33 to light L4, and the second optical element F2 receives the light L4. The CAN cap D29 and stem D21 form a cavity D35, and the pole D23, light emitting element D25, and monitor light receiving element D27 are located in the cavity D35. The monitor light receiving element D27 receives light from the rear end face of the light emitting element D25 in order to monitor an operating condition of the light emitting element D25.

The first light receiving subassembly PD1 has a stem P41, a submount P43, a light receiving element P45, a CAN cap P49, and a lens P53. The light receiving element P45 is mounted on the submount P43, and the submount P43 is provided on the stem P41. A photodiode, for example, can be used for the light receiving element P45. The light receiving element P45 has a light receiving surface for receiving light from the lens P53. The CAN cap P49 and stem P41 form a cavity P55. The submount P43 and light receiving element P45 are provided in the cavity P55. The CAN cap P49 holds the lens P53. The lens P53 receives light L5 from the first optical element F1. The light L5 passes through the lens P53 and the lens P53 converts the light L5 to L6, and the light receiving element P45 receives the light L6.

The second light receiving subassembly PD2 has a stem Q41, a submount Q43, a light receiving element Q45, a CAN cap Q49, and a lens Q53. The light receiving element Q45 is mounted on the submount Q43, and the submount Q43 is provided on the stem Q41. A photodiode, for example, is used for the light receiving element Q45. The light receiving element Q45 has a light receiving surface for receiving light from the lens Q53. The CAN cap Q49 and stem Q41 form a cavity Q55. The submount Q43 and the light receiving element Q45 are located in the cavity Q55. The CAN cap Q49 holds the lens Q53. The lens Q53 receives light L7 from the second optical element F2. The light L7 passes through the lens Q53 and the lens Q53 converts the light L7 to L8, and the light receiving element Q45 receives the light L8.

The first optical element F1 has a filter characteristic to reflect light of wavelength component $\lambda_1$ and to transmit light of wavelength components $\lambda_2$ and $\lambda_3$. For example, when a certain wavelength $\lambda_{12}$ is between the wavelength components $\lambda_1$ and $\lambda_2$, then the first optical element F1 has an optical spectrum to reflect light of a wavelength component not less than the wavelength $\lambda_{12}$ and to transmit light of a wavelength component less than the wavelength $\lambda_{12}$. The first optical element F1 can be, for example, a WDM filter.

The second optical element F2 has a filter characteristic to reflect light of the wavelength component $\lambda_2$ and to transmit light of the wavelength component $\lambda_3$. For example, when a certain wavelength $\lambda_{23}$ is between the wavelength components $\lambda_2$ and $\lambda_3$, then the second optical element F2 has an optical spectrum to reflect light of a wavelength component not less than the wavelength $\lambda_{23}$ and to transmit light of a wavelength component less than the wavelength $\lambda_{23}$. WDM filters, for example, can be used for the second optical element F2. Since the light of the wavelength component $\lambda_1$ is not incident to the second optical element F2, the optical characteristic of the second optical element F2 does not relate to transmission and reflection of the light of the wavelength component $\lambda_1$.

The third optical element F3 has a filter characteristic to transmit the light of the wavelength component $\lambda_1$ and to reflect or absorb the light of the wavelength components $\lambda_2$ and $\lambda_3$. For example, the third optical element F3 has an optical spectrum to transmit light of a wavelength component not less than the wavelength $\lambda_{12}$ and to reflect or absorb light of a wavelength component less than the wavelength $\lambda_{12}$. WDM filters, for example, can be used for the third optical element F3.

The fourth optical element F4 has a filter characteristic to transmit the light of the wavelength component $\lambda_2$ and to reflect or absorb the light beams of the wavelength components $\lambda_1$ and $\lambda_3$. For example, the fourth optical element F4 has an optical spectrum to reflect or absorb light of a wavelength component less than the wavelength $\lambda_{23}$, to transmit light of a wavelength component not less than the wavelength $\lambda_{23}$, and less than the wavelength $\lambda_{12}$, and to reflect or absorb light of a wavelength component not less than the wavelength $\lambda_{12}$. WDM filters, for example, can be used for the fourth optical element F4.

Figure 4:
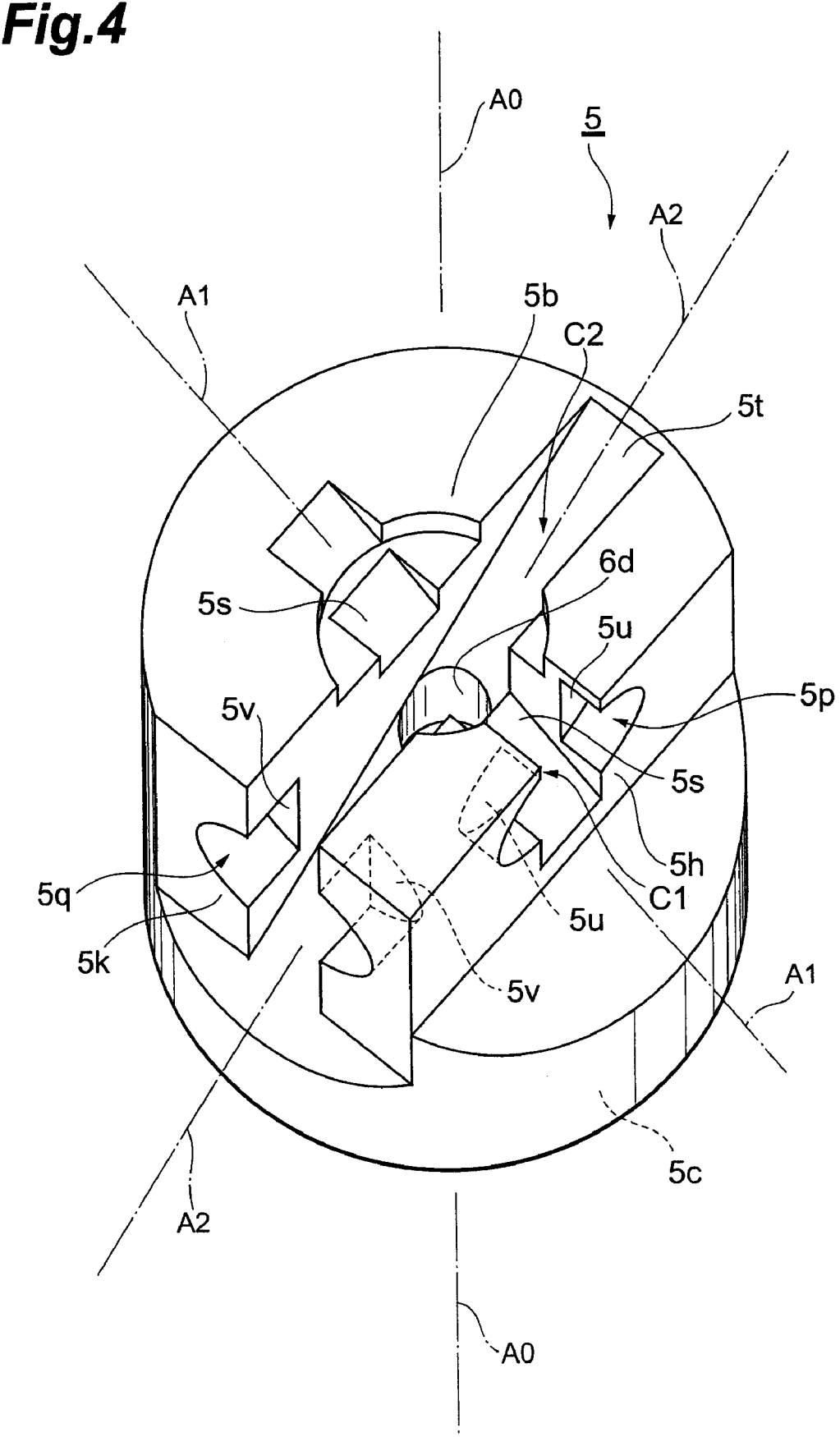
FIG. 4 is a perspective view showing an optical joint sleeve.
Figure 5:
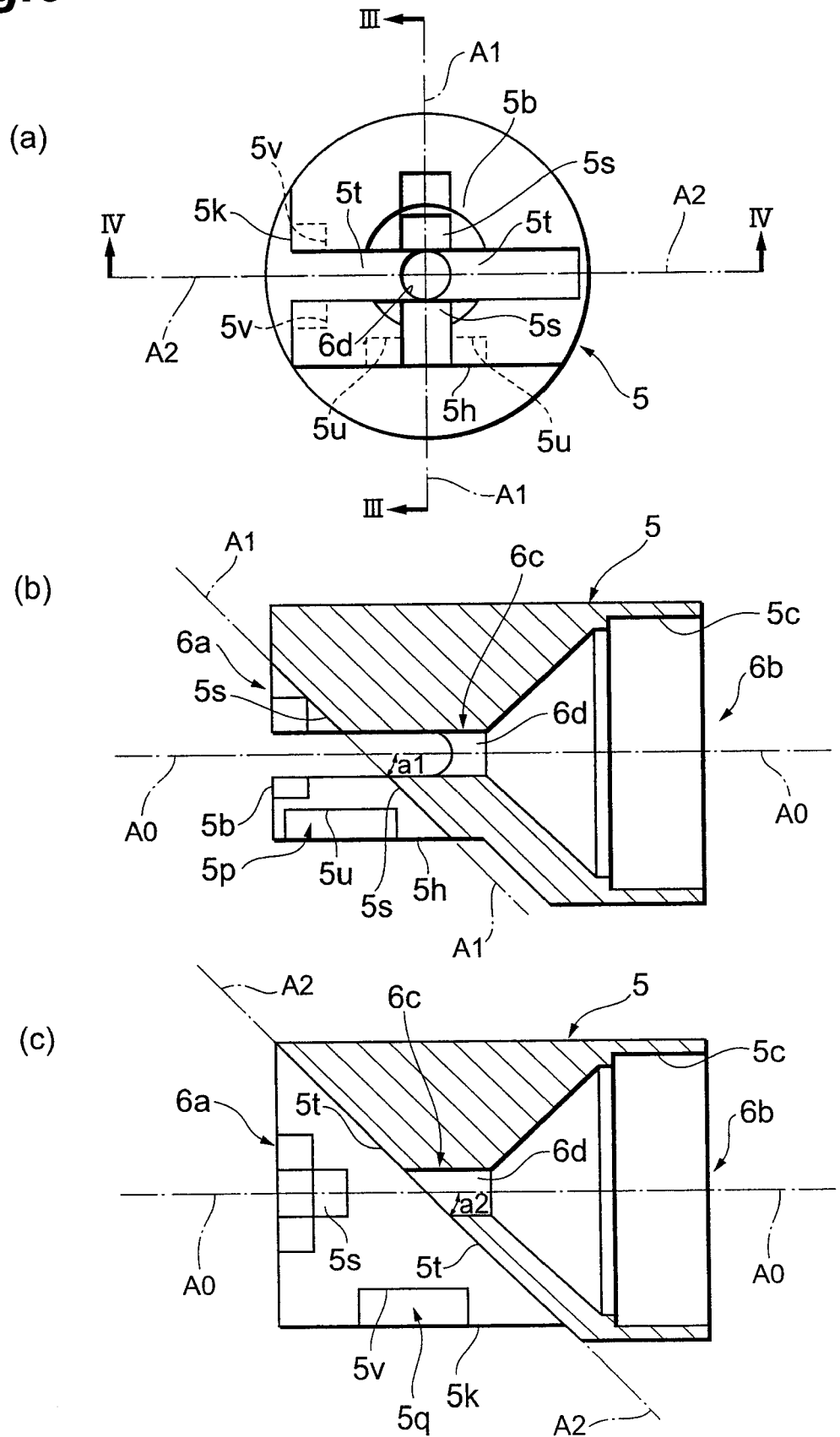
FIG. 5 includes area (a) showing a plan view of one end of the optical joint sleeve, area (b) showing a sectional view of the optical joint sleeve taken along line III-III, and area (c) showing a sectional view of the optical joint sleeve taken along line IV-IV.

The optical joint sleeve 5 will be described with reference to FIG. 4 and areas (a) to (c) of FIG. 5. FIG. 4 is a perspective view of the optical joint sleeve 5. Area (a) of FIG. 5 is a plan view showing one end of the optical joint sleeve 5. Area (b) of FIG. 5 is a sectional view of the optical joint sleeve 5 taken along line III-III. Area (c) of FIG. 5 is a sectional view of the optical joint sleeve 5 taken along line IV-IV.

The optical joint sleeve 5 has one end portion 6a, another end portion 6b, and a side wall portion 6c, and the one end portion 6a, another end portion 6b, and side wall portion 6c are arranged along an axis A0. The side wall portion 6c has an inside surface 6d extending along the axis A0 so as to permit light to pass through between the one end portion 6a and another end portion 6b. The optical joint sleeve 5 has a first mount surface 5s for mounting the first optical element F1 thereon and a second mount surface 5t for mounting the second optical element F2 thereon. The first mount surface 5s is inclined relative to the axis A0 and extends along an axis A1 intersecting with the axis A0. The second mount surface 5t is inclined relative to the axis A0 and extends along an axis A2 intersecting with the axis A. The first mount surface 5s constitutes a bottom surface of groove C1 extending along the axis A1. The second mount surface 5t constitutes a bottom surface of groove C2 extending along the axis A2. The groove C1 is shallower than the groove C2. A plane defined by the axis A0 and the axis A1 corresponds to the plane S1 (shown in FIG. 1), and a plane defined by the axis A0 and the axis A2 corresponds to the plane S2 (shown in FIG. 1). The plane S1 and plane S2 can be arranged so that they intersect with each other at the angle θ on the axis A0, as described above, when the optical joint sleeve 5 is disposed in the optical module. The axis A0 and the axis A1 intersect with each other at an angle of α1. The angle α1 is in the range of 25 to 60 degrees and the angle α1 is, for example, 48 degrees. The axis A0 and the axis A2 intersect at an angle of α2. The angle α2 is in the range of 25 to 60 degrees and α2 is, for example, the angle of 45 degrees. An intersection point of the axis A2 with the axis A0 is located at a position different from an intersection of the axis A1 with the axis A0.

The optical joint sleeve 5 has a third mount surface 5u for mounting the third optical element F3 thereon, and a fourth mount surface 5v for mounting the fourth optical element F4 thereon. The third mount surface 5u constitutes a bottom surface of a reception portion 5p for receiving the third optical element F3 therein, and the fourth mount surface 5v constitutes a bottom surface of a reception portion 5q for receiving the fourth optical element F4 therein. The third mount surface 5u is provided such that the third optical element F3 can be mounted between the first optical element F1 and the first light receiving subassembly PD1. The fourth mount surface 5v is provided such that the fourth optical element F4 can be mounted between the second optical element F2 and the second light receiving subassembly PD2.

The optical joint sleeve 5 has support surfaces 5b, 5c, 5h, and 5k which support the light transmitting part 3, the light emitting subassembly LD3, the first light receiving subassembly PD1, and the second light receiving subassembly PD2, respectively. The light transmitting part 3 is supported by the support surface 5b and is located at one end portion 6a. The light emitting subassembly LD3 is supported by the support surface 5c and is located at another end portion 6b. The first light receiving subassembly PD1 is supported by the support surface 5h and is located on the side face of the optical joint sleeve 5. The second light receiving subassembly PD2 is supported by the support surface 5k and is located on another side face of the optical joint sleeve 5.

Figure 6:
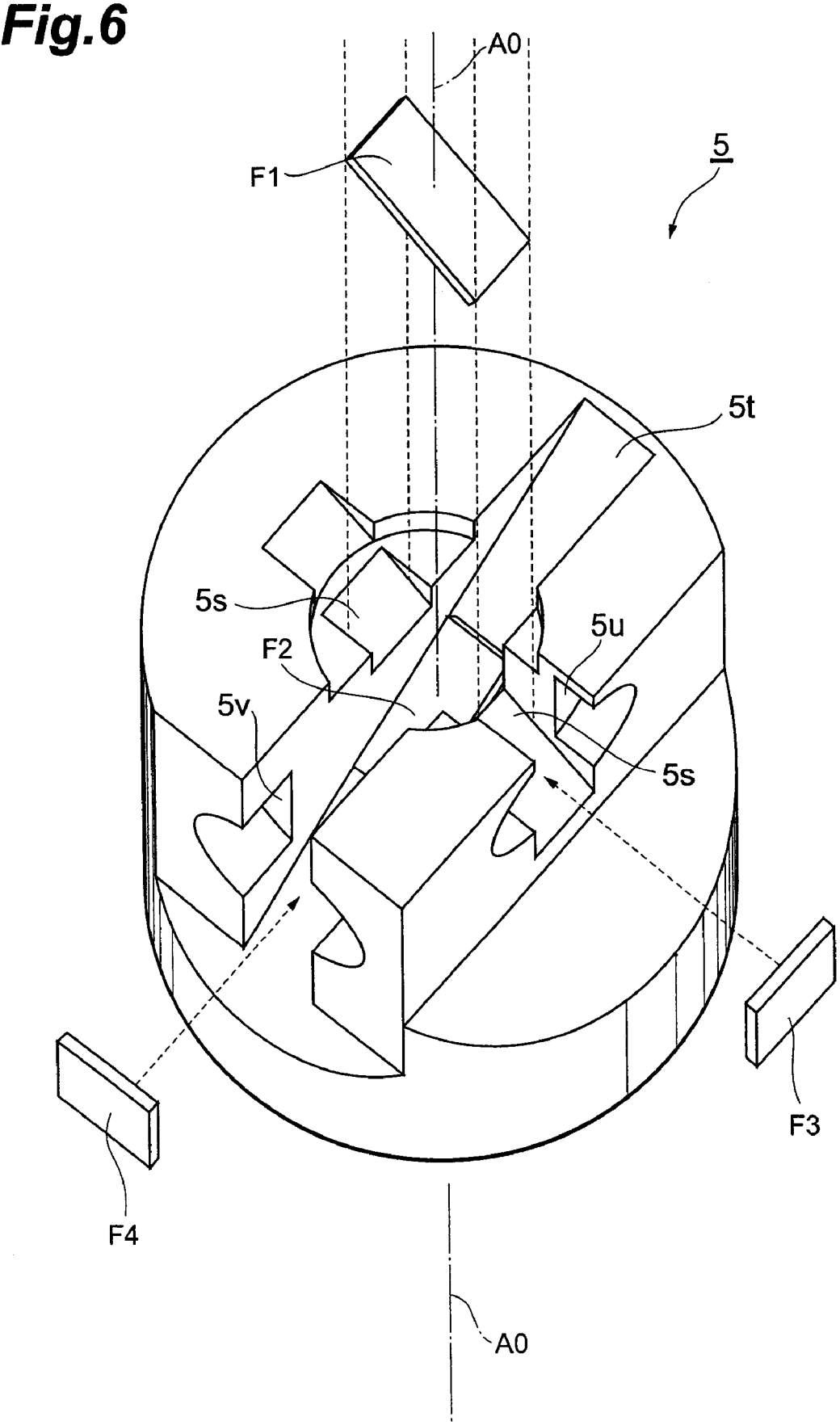
FIG. 6 is an exploded perspective view of the optical joint sleeve mounting first to fourth optical elements.
Figure 7:
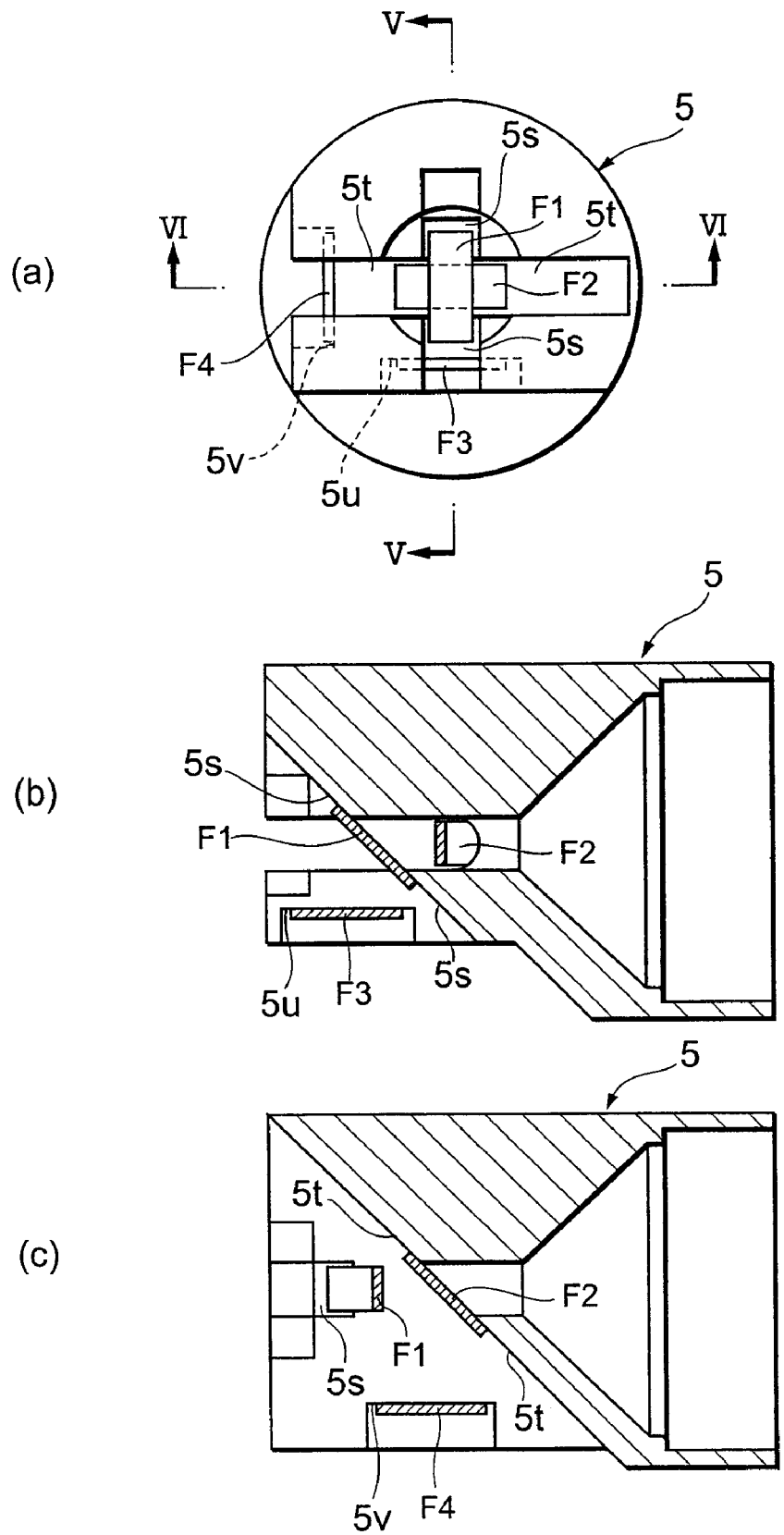
FIG. 7 includes area (a) showing a plan view of one end of the optical joint sleeve, area (b) showing a sectional view of the optical joint sleeve taken along line V-V, and area (c) showing a sectional view of the optical joint sleeve taken along line VI-VI.

The optical joint sleeve 5 that mounts the first optical element F1, the second optical element F2, the third optical element F3, and the fourth optical element F4 thereon will be described with reference to FIG. 6 and areas (a) to (c) of FIG. 7. FIG. 6 is an exploded perspective view showing the optical joint sleeve 5 that mounts the first optical element F1, the second optical element F2, the third optical element F3, and the fourth optical element F4 thereon. Area (a) of FIG. 7 is a plan view showing one end of this optical joint sleeve 5. Area (b) of FIG. 7 is a sectional view showing the optical joint sleeve 5 taken along line V-V in area (a) of FIG. 7. Area (c) of FIG. 7 is a sectional view showing the optical joint sleeve 5 taken along line VI-VI in area (a) of FIG. 7.

The first optical element F1 is provided so as to intersect with the axis A0. Since the first optical element F1 is mounted along the first mount surface 5s, the reflecting surface of the first optical element F1 is inclined at the angle α1 relative to the axis A. The second optical element F2 is provided so as to intersect with the axis A. Since the second optical element F2 is located along the second mount surface 5t, the reflecting surface of the second optical element F2 is inclined at the angle α2 relative to the axis A0.

The third optical element F3 is mounted on the third mount surface 5u. The third optical element F3 is located between the first optical element F1 and the support surface 5h. The fourth optical element F4 is mounted on the fourth mount surface 5v. The fourth optical element F4 is located between the second optical element F2 and the support surface 5k.

Reception/transmission of signal light in the optical module 1 will be described with reference to areas (a) and (b) of FIG. 8. Area (a) of FIG. 8 shows a sectional view of optical module 1 taken along line I-I in FIG. 1. Area (b) of FIG. 8 shows a sectional view of optical module 1 taken along line II-II in FIG. 1.

When an optical signal of the wavelength component $\lambda_1$ is transmitted through the light transmitting part 3, the optical signal B11 of the wavelength component $\lambda_1$ is outputted from the light transmitting part 3. The optical signal B11 is incident to the first optical element F1 and a part of the incident light is reflected by the first optical element F1 and is converted to the optical signal B12. The optical signal B12 is transmitted by the third optical element F3 to enter the light receiving element P45 of the first light receiving subassembly PD1. The light receiving element P45 converts the received signal light B12 into an electric signal.

When an optical signal of the wavelength component $\lambda_2$ is transmitted through the light transmitting part 3, the optical signal B21 of the wavelength component $\lambda_2$ is outputted from the light transmitting part 3. The optical signal B21 is transmitted through the first optical element F1 and thereafter is incident to the second optical element F2. A part of the optical signal B21 is reflected by the second optical element F2 and is converted thereby to an optical signal B22. The optical signal B22 is transmitted through the fourth optical element F4 and thereafter is incident to the light receiving element Q45 of the second light receiving subassembly PD2. The light receiving element Q45 converts the received optical signal B22 into an electric signal.

The light emitting element D25 of the light emitting subassembly LD3 emits an optical signal B31 of the wavelength component $\lambda_3$ in response to an electric signal. The signal light B31 passes through the second optical element F2 and the first optical element F1 and then enters the light transmitting part 3. The light transmitting part 3 transmits the optical signal B31.

In an example, an optical signal fed to the optical module 1 includes an analog modulated signal component and a digital modulated signal component. The analog modulated signal component has the wavelength $\lambda_1$ as a video signal and the digital modulated signal component has the wavelength $\lambda_2$.

The optical signal outputted from the optical module 1 is a digital modulated signal of the wavelength $\lambda_3$. The relationship, $\lambda_1 > \lambda_2 > \lambda_3$, holds among the wavelengths $\lambda_1$, $\lambda_2$, and $\lambda_3$. For example, the wavelength $\lambda_1$ is in the range of 1.54 μm or more and 1.65 μm or less, the wavelength $\lambda_2$ is in the range of 1.47 μm or more and 1.50 μm or less, and the wavelength $\lambda_3$ is in the range of 1.26 μm or more and 1.38 μm or less. For example, they are set $\lambda_1$=1.55 μm, $\lambda_2$=1.49 μm, and $\lambda_3$=1.31 μm. As described above, the optical module 1 receives or transmits the optical signal from or to an external device through the light transmitting part 3.

Since the optical module 1 is provided with the light emitting subassembly LD3 and the two first light receiving subassembly PD1 and second light receiving subassembly PD2, it is able to perform reception of the optical signal of the wavelength component $\lambda_2$, in addition to the reception of the optical signal of the wavelength component $\lambda_1$ and the transmission of the optical signal of the wavelength component $\lambda_3$.

In a preferred example, the optical module 1 processes light of a wavelength component having the relationship of $\lambda_1 > \lambda_2 > \lambda_3$. The first optical element F1 can be a filter having a filter characteristic to reflect light of a wavelength component not less than the wavelength $\lambda_{12}$ and to transmit light of a wavelength component less than the wavelength $\lambda_{12}$, and the second optical element F2 can be a filter having a filter characteristic to reflect light of a wavelength component not less than the wavelength $\lambda_{23}$ and to transmit light of a wavelength component less than the wavelength $\lambda_{23}$. In another preferred example, the optical module 1 processes light of wavelength components having the relationship of the wavelengths $\lambda_1 < \lambda_2 < \lambda_3$. The first optical element F1 can be a filter having a filter characteristic to reflect light of a wavelength component less than the wavelength $\lambda_{12}$ and to transmit light of a wavelength component not less than the wavelength $\lambda_{12}$, and the second optical element F2 can be a filter having a filter characteristic to reflect light of a wavelength component less than the wavelength $\lambda_{23}$ and to transmit light of a wavelength component not less than the wavelength $\lambda_{23}$.

In the optical module 1, if the third optical element F3 is located between the first optical element F1 and the first light receiving subassembly PD1, the light of the wavelength components $\lambda_2$ and $\lambda_3$ can be prevented from entering the first light receiving subassembly PD1, thereby reducing noise in the first light receiving subassembly PD1. In the optical module 1, if the fourth optical element F4 is located between the second optical element F2 and the second light receiving subassembly PD2, the light of the wavelength components $\lambda_1$ and $\lambda_3$ can be prevented from entering the second light receiving subassembly PD2, thereby reducing noise in the second light receiving subassembly PD2.

In the optical module 1, the first optical element F1 and the second optical element F2 are positioned through the optical joint sleeve 5 by means of the first mount surface 5s and the second mount surface 5t. Therefore, it becomes easier to assemble the optical module 1.

Figure 9:
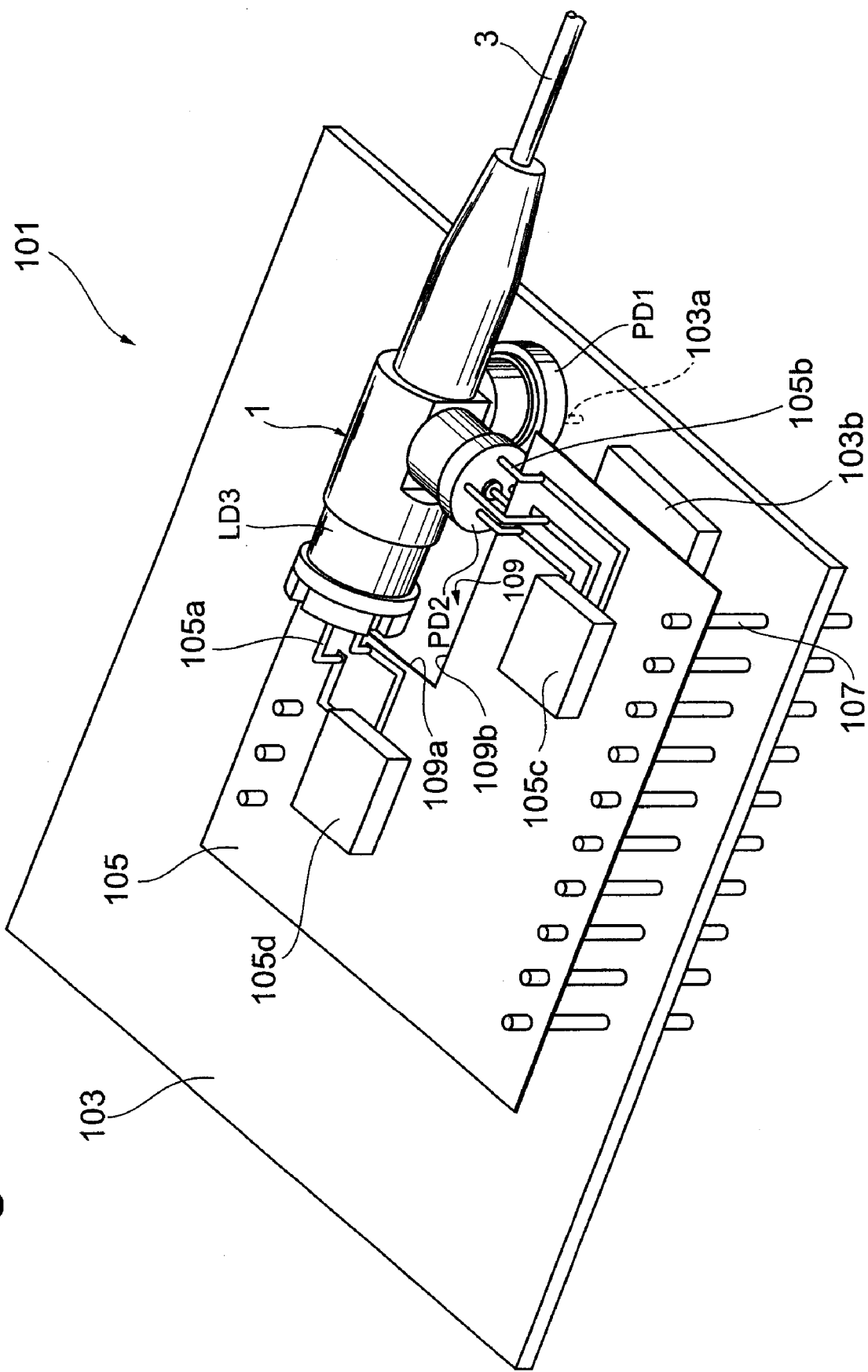
FIG. 9 shows a perspective view of an optical transceiver.
Figure 10:
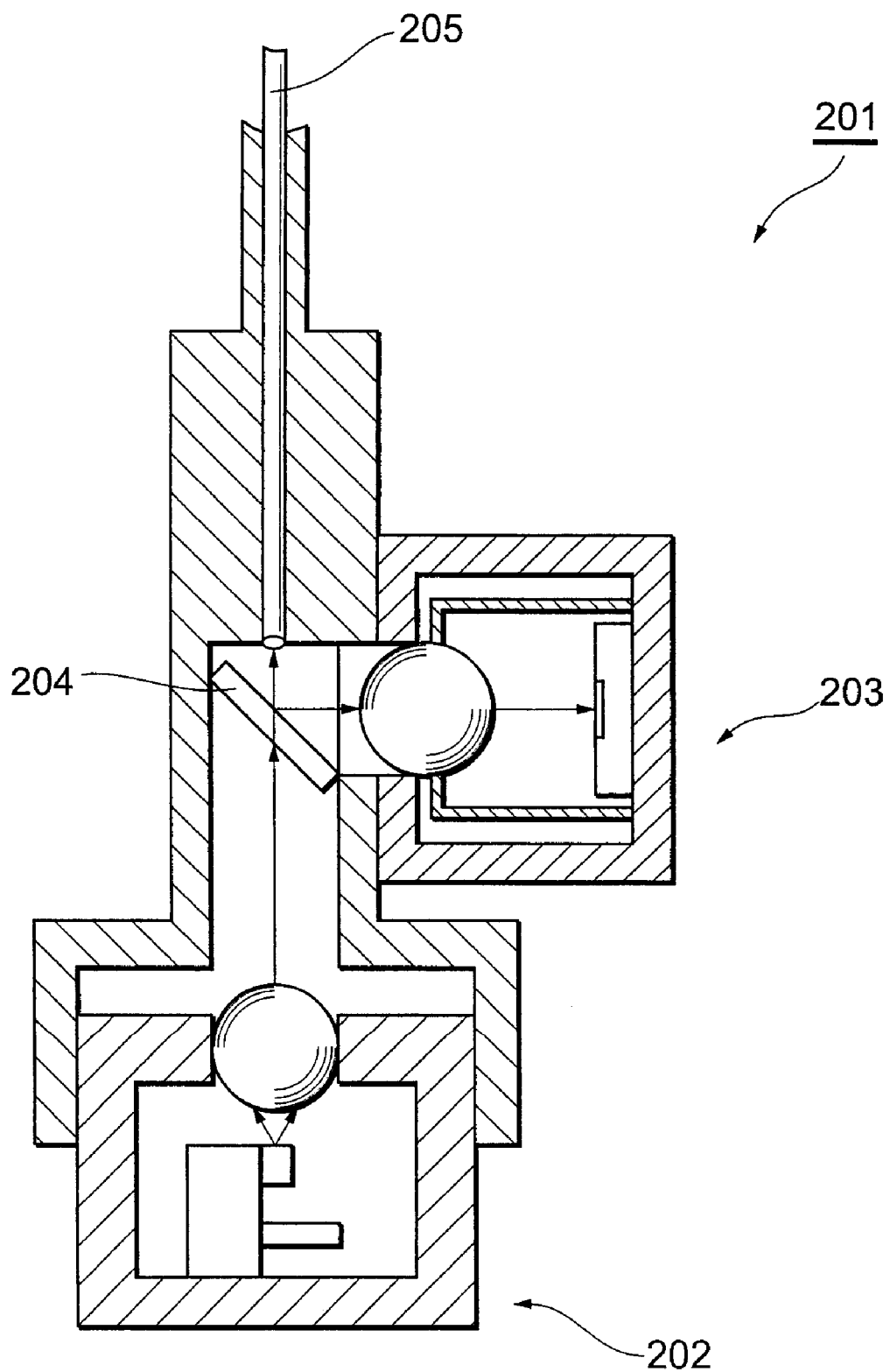
FIG. 10 is a drawing showing a conventional optical module with a transmitting portion and a receiving portion.

Subsequently, an optical transceiver 101 according to an embodiment of the present invention will be described. FIG. 9 is a perspective view of optical transceiver 101. The optical transceiver 101 is able to transmit light of, for example, a digital modulated signal of the wavelength component $\lambda_3$, to receive light of a digital modulated signal of the wavelength component $\lambda_2$, and to receive light of an analog modulated signal of the wavelength component $\lambda_1$. The analog modulated signal light can be used, for example, for transmitting a CATV video signal. For example, the wavelength component $\lambda_1$ is in the range of 1.54 μm or more and 1.65 μm or less, the wavelength component $\lambda_2$ is in the range of 1.47 μm or more and 1.50 μm or less, and the wavelength component $\lambda_3$ is in the range of 1.26 μm or more and 1.38 μm or less. For example, they can be set as $\lambda_1$=1.55 μm, $\lambda_2$=1.49 μm, and $\lambda_3$=1.31 μm.

The optical transceiver 101 comprises the optical module 1, a first substrate 103, and a second substrate 105. The first substrate 103 mounts the second substrate 105 thereon and one surface of the first substrate 103 faces one surface of the second substrate 105. Preferably, the first substrate 103 and the second substrate 105 extend substantially in parallel with the reference plane S2. A circuit for processing an analog modulated signal is provided on the first substrate 103, and the first substrate 103 is electrically connected to lead pins 103a of the first light receiving subassembly PD1. The first substrate 103 mounts an electronic device 103b thereon for processing an analog modulated signal from the first light receiving subassembly PD1.

A circuit for processing a digital modulated signal is provided on the second substrate 105. The second substrate 105 is electrically connected to lead pins 105a of the light emitting subassembly LD3. In addition, the second substrate 105 is electrically connected to lead pins 105b of the second light receiving subassembly PD2. The second substrate 105 mounts an electronic device 105c and an electronic device 105d thereon. The electronic device 105c is provided for processing a digital modulated signal from the second light receiving subassembly PD2, and the electronic device 105d is provided for providing a processed, digital modulated signal to the light emitting subassembly LD3. The second substrate 105 is connected through lead terminals 107 to the first substrate 103 and the second substrate 105 is placed above the first substrate 103. The second substrate 105 has an opening 109 for receiving the optical module 1. One edge 109a of the opening 109 extends along the bottom surface of the light emitting subassembly LD3, and another edge 109b of the opening 109 extends along the bottom surface of the light receiving subassembly PD2. The bottom face of the light receiving subassembly PD1 faces the surface of the first substrate 103. The combination of the two substrates 103, 105 and the opening 109 is suitable for the optical module for processing the digital modulated signal light and analog modulated signal light.

In the optical transceiver 101, the processing circuit for analog modulated signal is provided on the first substrate 103. The processing circuit for digital modulated signal is provided on the second substrate 105. Since the two processing circuits can be provided on the separate substrates, circuit design flexibility can be greatly increased. Since in the optical transceiver 101 the processing circuit for analog modulated signal susceptible to noise can be electrically separated from the processing circuit for digital modulated signal, high S/N ratios can be achieved at each of the circuits.

Having described and illustrated the principle of the invention in preferred embodiments thereof, it is appreciated by those having skill in the art that the invention can be modified in arrangement and detail without departing from such principles. We therefore claim all modifications and variations coming within the spirit and scope of the following claims.

INDUSTRIAL APPLICABILITY

The present invention successfully provides the optical module and optical transceiver capable of transmitting and receiving signals through the light transmitting portion and receiving still another signal, and the optical joint sleeve for these optical module and optical transceiver.

The invention claimed is:

1. An optical module comprising:
a first optical element for reflecting an optical signal of a first wavelength component and transmitting an optical signal of second and third wavelength components;
a first light receiving subassembly, optically coupled to the first optical element, provided to receive the optical signal of the first wavelength component;
a second optical element for reflecting the optical signal of the second wavelength component and transmitting the optical signal of the third wavelength component;
a second light receiving subassembly, optically coupled to the second optical element, provided to receive the optical signal of the second wavelength component;
a light emitting subassembly, optically coupled to the second optical element, provided to generate the optical signal of the third wavelength component;
an optical joint sleeve having a first mount surface to mount the first optical element and a second mount surface to mount the second optical element, wherein the first mount surface is a bottom surface of a first groove and the second mount surface is a bottom surface of a second groove that intersects the first groove; and
a light transmitting part optically coupled to the first optical element, wherein the light emitting subassembly, the first optical element, the second optical element, and the first light receiving subassembly are arranged along a first predetermined plane, and the light emitting subassembly, the first optical element, the second optical element, and the second light receiving subassembly are arranged along a second predetermined plane intersecting at a predetermined angle with the predetermined plane.

2. The optical module according to claim 1, wherein the second wavelength component is between the first wavelength component and the third wavelength component.

3. The optical module according to claim 1, further comprising a third optical element provided between the first optical element and the first light receiving subassembly and having an optical characteristic to transmit the optical signal of the first wavelength component and to reflect or absorb the optical signal of the second and third wavelength components.

4. The optical module according to claim 3, further comprising a fourth optical element provided between the second optical element and the second light receiving subassembly and having an optical characteristic to transmit the optical signal of the second wavelength component and to reflect or absorb the optical signal of the first and third wavelength components.

5. The optical module according to claim 1, further comprising a fourth optical element provided between the second optical element and the second light receiving subassembly and having an optical characteristic to transmit the optical signal of the second wavelength component and to reflect or absorb the optical signal of the first and third wavelength components.

6. The optical module according to claim 1, wherein the light transmitting part has an optical fiber, the light emitting subassembly has a semiconductor laser, and each of the first and second light receiving subassemblies has a photodiode.

7. The optical module according to claim 1, wherein the first wavelength component is 1.54 μm or more and 1.65 μm or less,
wherein the second wavelength component is 1.47 μm or more and 1.50 μm or less, and wherein the third wavelength component is 1.26 μm or more and 1.38 μm or less.

8. The optical module according to claim 1, wherein the optical joint sleeve comprises:
   one end portion, another end portion and a side wall portion arranged along a predetermined axis wherein the first mount surface extends along a first axis intersecting with the predetermined axis and the second mount surface extends along a second axis intersecting with the predetermined axis,
   wherein the side wall portion has a side face extending in a direction of the predetermined axis so as to permit light to pass through from one of the one end portion and the other end portion to the other,
   wherein a first plane defined by the first axis and the predetermined axis intersects with a second plane defined by the second axis and the predetermined axis,
   wherein the light transmitting part is provided at the one end portion of the optical joint sleeve,
   wherein the light emitting subassembly is provided at the other end portion,
   wherein the first optical element is mounted on the first mount surface,
   wherein the second optical element is mounted on the second mount surface, and
   wherein the optical joint sleeve holds the first light receiving subassembly and the second light receiving subassembly.

9. The optical module according to claim 8, wherein the side wall portion of the joint sleeve includes a first support positioned relative to the first mount surface and provided for supporting the first light receiving subassembly,
   wherein the side wall portion of the joint sleeve includes a second support positioned relative to the second mount surface and provided for supporting the second light receiving subassembly,
   wherein the first light receiving subassembly is provided on the first support of the side wall portion,
   wherein the first light receiving subassembly is positioned relative to the first optical element,
   wherein the second light receiving subassembly is positioned relative to the second optical element,
   wherein the light emitting subassembly is provided at said one end portion of the joint sleeve, and
   wherein the light emitting subassembly is positioned relative to the second optical element.

10. The optical module according to claim 9, wherein the light transmitting part is positioned relative to the first optical element.

11. The optical module according to claim 10, wherein the first optical element, the second optical element, and the light emitting subassembly are arranged along the predetermined axis by means of the joint sleeve.

12. An optical transceiver comprising:
   the optical module as set forth in claim 1;
   a first substrate electrically connected to the first light receiving subassembly; and
   a second substrate electrically connected to the light emitting subassembly and the second light receiving subassembly, and extending along the second predetermined plane.

13. The optical transceiver according to claim 12, wherein the first light receiving subassembly receives a video signal light, and
   wherein the second light receiving subassembly receives a digital modulated signal light.

14. The optical transceiver according to claim 12, wherein the first light receiving subassembly receives an analog modulated signal light, and
   wherein the second light receiving subassembly receives a digital modulated signal light.

15. The optical transceiver according to claim 13, wherein the first light receiving subassembly receives an analog modulated signal light, and
   wherein the second light receiving subassembly receives a digital modulated signal light.

16. The optical transceiver according to claim 12, wherein the first substrate mounts the second substrate thereon, and
   wherein the second substrate and the optical module are provided along the second predetermined plane.

17. The optical transceiver according to claim 12, further comprising:
   a first electronic device mounted on the first substrate and provided to process a video signal from the first light receiving subassembly; and
   a second electronic device mounted on the second substrate and provided to process a digital modulated signal from the second light receiving subassembly.

18. The optical transceiver according to claim 12, further comprising:
   a processing circuit mounted on the first substrate and provided to process an analog modulated signal from the first light receiving subassembly; and
   a processing circuit mounted on the second substrate and provided to process a digital modulated signal from the second light receiving subassembly.

19. The optical module according to claim 3, wherein the optical joint sleeve has a third mount surface to mount the third optical element.

20. The optical module according to claim 4, wherein the optical joint sleeve has a fourth mount surface to mount the fourth optical element.

21. The optical module according to claim 5, wherein the optical joint sleeve has a fourth mount surface to mount the fourth optical element.

* * * * *